United States Patent
Mestanov et al.

(10) Patent No.: US 11,290,952 B2
(45) Date of Patent: Mar. 29, 2022

(54) MANAGING NON-COORDINATED RADIO ACCESS NETWORKS

(71) Applicant: Telefonaktiebolaget LM Ericsson (publ), Stockholm (SE)

(72) Inventors: Filip Mestanov, Brottby (SE); Tomas Hedberg, Nacka (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 23 days.

(21) Appl. No.: 16/980,945

(22) PCT Filed: Mar. 16, 2018

(86) PCT No.: PCT/SE2018/050262
§ 371 (c)(1),
(2) Date: Sep. 15, 2020

(87) PCT Pub. No.: WO2019/177507
PCT Pub. Date: Sep. 19, 2019

(65) Prior Publication Data
US 2021/0068046 A1   Mar. 4, 2021

(51) Int. Cl.
*H04W 48/18* (2009.01)
*H04W 48/10* (2009.01)

(52) U.S. Cl.
CPC .......... *H04W 48/18* (2013.01); *H04W 48/10* (2013.01)

(58) Field of Classification Search
None
See application file for complete search history.

(56) References Cited

U.S. PATENT DOCUMENTS

| 2014/0148165 A1 | 5/2014 | Serravalle et al. |
| 2015/0365790 A1* | 12/2015 | Edge .............. G01S 19/11 455/404.2 |
| 2017/0171903 A1* | 6/2017 | Kubota ............. H04W 76/19 |

FOREIGN PATENT DOCUMENTS

EP    2421302 A1    2/2012

OTHER PUBLICATIONS

International Search Report and Written Opinion of the International Searching Authority for International Application No. PCT/SE2018/050262, dated Dec. 6, 2018.

(Continued)

*Primary Examiner* — Hong S Cho
(74) *Attorney, Agent, or Firm* — Sage Patent Group

(57) ABSTRACT

The invention relates to methods and devices for managing a plurality of non-coordinated radio access networks.
In an aspect, a method of a mobility management node is provided for managing a plurality of non-coordinated radio access networks (RANs) in a wireless communication network.
The method comprises receiving, from a base station of a first of the plurality of RANs, information indicating frequencies available in the first RAN for accessing a network served by the mobility management node, acquiring information identifying a base station of a second of the plurality of RANs, said network being operated by an operator different from those operating the first and second RANs; and transmitting, to the base station of the second RAN, the information indicating the frequencies available in the first RAN for accessing said network.

20 Claims, 6 Drawing Sheets

(56) References Cited

OTHER PUBLICATIONS

NGMN Alliance, "Next Generation Converged Operations Requirements (NGCOR)," NGMN Next Generation Converged Operations Requirements Version 1.4, Jul. 22, 2013, 489 pages.

3GPP TR 23.851 V2.0.0. "3rd Generation Partnership Project; Technical Specification Group Services and System Aspects; Network Sharing; Architecture and Functional Description (Release 6)," Technical Report, Mar. 2004, 23 pages.

\* cited by examiner

MANAGING NON-COORDINATED RADIO ACCESS NETWORKS

CROSS REFERENCE TO RELATED APPLICATION

This application is a 35 U.S.C. § 371 national stage application of PCT International Application No. PCT/SE2018/050262 filed on Mar. 16, 2018, the disclosure and content of which is incorporated by reference herein in its entirety.

TECHNICAL FIELD

The invention relates to methods and devices for managing a plurality of non-coordinated radio access networks.

BACKGROUND

Today's utilities sector is undergoing a digital transformation driven by advancement in power generation technologies, which enables an increasing portion of energy supply to come from decentralized local power production sources, such as photovoltaics, wind and water turbines, energy harvesters, etc.

Simultaneously, the electrical grid itself is evolving to cater for a paradigm shift from centralized to decentralized power generation and distribution. The utilities sector is now turning to communication technologies, which will help transforming their business and enable new use cases.

In large parts of the high-voltage transmission networks, the utilities sector is using fibre technologies which provide high-speed, reliable and resilient communication. However, one down-side of deploying fibre to all locations that need to be connected is its cost: it is simply not economical to deploy fibre everywhere.

In search for an alternative communication technology that can be used to address the use cases of interest at an economically feasible price point, the utilities sector has developed an interest in the latest generation cellular technologies.

While today, cellular technologies are mainly owned and managed by mobile network operators (MNOs), the future use of those technologies expands beyond that single ownership model. One reason for this is service level agreements (SLAs) usually offered by the MNO to their customers; the SLAs of today are mainly derived based on the assumption that the customer will use the network for non-critical services, such as data, video, voice-calls. However, some of the use cases for which the utilities sector is planning to use the communication network are much more demanding, with far stricter requirements on reliability, availability, latency, etc.

Since the MNOs have not built their network with the support for critical use cases in mind, many of them are usually reluctant to contractually commit to supporting such use cases. Therefore, the utilities sector is exploring alternative solutions, or alternative network ownership models, which better address its needs.

Such needs include (a) ubiquitous, always-on telecom services, which ensure high reliability, high availability and low latency of the network to support critical services and which guarantees full coverage of the electrical grid, (b) control over the owned or rented service, which gives end-to-end autonomy and visibility and which promotes strict control and security mechanisms to manage the critical infrastructure, and (c) risk management, which enables control of commercial and operational risk and promotes risk mitigation in case of technical failures.

Hence, a problem with today's telecommunication structures is that the structures do no meet these needs and thus cannot be used by the utilities sector.

SUMMARY

An object of the invention is to solve, or at least mitigate, this problem and thus to provide a method of a mobility management node in a core network of managing a plurality of non-coordinated radio access networks (RANs), and methods enabling for base stations to manage mobility of a wireless communication device between the non-coordinated RANs.

This object is attained in a first aspect of the invention by a method of a base station of a first of a plurality of non-coordinated radio access networks (RANs) in a wireless communication network of facilitating, for a base station of a second of the plurality of non-coordinated RANs, connection of at least one wireless communication device which can be served by the base station of the first RAN. The method comprises determining that information indicating frequencies associated with an identifier of a network which said at least one wireless communication device is allowed to access should be transmitted to a mobility management node serving the identified network, the indicated frequencies being available in the first RAN for accessing the identified network, and transmitting the information indicating frequencies available in the first RAN for accessing said identified network to the mobility management node serving the identified network for forwarding to the base station of the second RAN, said identified network being operated by an operator different from those operating the first and second non-coordinated RANs.

This object is attained in a second aspect of the invention by a base station of a first of a plurality of non-coordinated RANs in a wireless communication network configured to facilitate, for a base station of a second of the plurality of non-coordinated RANs, connection of at least one wireless communication device which can be served by the base station of the first RAN, said base station comprising a processing unit and a memory, said memory containing instructions executable by said processing unit, whereby the base station is operative to determine that information indicating frequencies associated with an identifier of a network which said at least one wireless communication device is allowed to access should be transmitted to a mobility management node serving the identified network, the indicated frequencies being available in the first RAN for accessing the identified network, and to transmit the information indicating frequencies available in the first RAN for accessing said identified network to the mobility management node serving the identified network for forwarding to the base station of the second RAN, said identified network being operated by an operator different from those operating the first and second non-coordinated RANs.

This object is attained in a third aspect of the invention by a method of a mobility management node of managing a plurality of non-coordinated RANs in a wireless communication network. The method comprises receiving, from a base station of a first of the plurality of RANs, information indicating frequencies available in the first RAN for accessing a network served by the mobility management node, acquiring information identifying a base station of a second of the plurality of RANs, said network being operated by an operator different from those operating the first and second RANs, and transmitting, to the base station of the second RAN, the information indicating the frequencies available in the first RAN for accessing said network served by the mobility management node.

This object is attained in a fourth aspect of the invention by a mobility management node configured to manage a plurality of non-coordinated RANs in a wireless communication network, said mobility management node comprising a processing unit and a memory, said memory containing instructions executable by said processing unit, whereby the mobility management node is operative to receive, from a base station of a first of the plurality of RANs, information indicating frequencies available in the first RAN for accessing a network served by the mobility management node, acquire information identifying a base station of a second of the plurality of RANs, said network being operated by an operator different from those operating the first and second RANs, and to transmit, to the base station of the second RAN, the information indicating the frequencies available in the first RAN for accessing said network.

This object is attained in a fifth aspect of the invention by a method of a base station of a second of a plurality of non-coordinated RANs in a wireless communication network of facilitating connection of at least one wireless communication device to a first of the plurality of non-coordinated RANs. The method comprises receiving, from a mobility management node, information indicating frequencies available in the first RAN for accessing a network served by the mobility management node, said network being operated by an operator different from those operating the first and second RANs.

This object is attained in a sixth aspect of the invention by a base station of a second of a plurality of non-coordinated RANs in a wireless communication network configured to facilitate connection of at least one wireless communication device to a first of the plurality of non-coordinated RANs, said base station comprising a processing unit and a memory, said memory containing instructions executable by said processing unit, whereby the base station is operative to receive, from a mobility management node, information indicating frequencies available in the first RAN for accessing a network served by the mobility management node, said network being operated by an operator different from those operating the first and second RANs.

In brief, a problem with a so called Multi-Operator Core Network (MOCN) with multiple non-coordinated RANs is that a service of a utilities party is available in two different RANs that are unaware of each other, and there is no coordination of the two.

The invention solves this problem by providing a solution where one or more base stations operated by one operator are made aware of overlapping or neighboring RAN cells provided by one or more base stations hosted by another operator, which is particularly useful for the deployment referred to as MOCN with multiple non-coordinated RAN. Advantageously, both idle mode mobility (cell reselection) and connected mode mobility (handover) between RANs operated by different operators is facilitated and thus prevents service interruption at wireless communication device.

In an embodiment, the base station of the first RAN sends, to the mobility management node, an identifier of the network served by the mobility management node.

In an embodiment, the determining at the base station of the first RAN that the information indicating the available frequencies should be transmitted to the mobility management node is triggered by one or more of events including a configuration change for the base station of the first RAN, a boot process of the base station of the first RAN, and a message received from the mobility management node.

In another embodiment, the base station of the first RAN is further operative to transmit a Tracking Area Identity (TAI) and/or a Global eNB Identifier of the base station of the first RAN to the mobility management node with the information indicating the available frequencies.

In a further embodiment, the mobility management node is operative to, when transmitting the information indicating the frequencies available in the first RAN for accessing the network served by the mobility management node, transmitting an identifier of the base station of the first RAN.

In still an embodiment, the mobility management node is further operative to, when acquiring the information identifying the base station of the second RAN; send a request for the information to an external information providing device, the device storing information identifying one or more base stations to which said at least one wireless communication device is capable of connecting; and receiving, in response to the request, the information identifying said base station of the second RAN.

The mobility management node may be embodied in the form of a Mobility Management Entity (MME) or an Access and Mobility Management Function (AMF).

In yet an embodiment, the base station of the second RAN is operative to receive an identifier of the base station (202) of the first RAN when receiving the information indicating the frequencies available in the first RAN for accessing the network served by the mobility management node. Advantageously, this provides for idle mode mobility management of the wireless communication device.

In an embodiment, the base station of the second RAN is operative to store the received information indicating frequencies available in the first RAN for accessing a network served by the mobility management node, in order to subsequently manage idle or connected mode mobility of said at least one wireless communication device being capable of accessing said network.

In a further embodiment, in order to manage connected mode mobility, the base station of the second RAN further stores handover routing information such as Tracking Area Identity (TAI) and/or a Global eNB Identifier of the base station of the first RAN.

In another embodiment, the base station of the second RAN is operative to transmit, to said at least one wireless communication device, the information indicating the frequencies available in the first RAN for accessing the network served by the mobility management node, for instance for managing idle mode mobility (optionally along with the identifier of the network served by the mobility management node).

In a further embodiment, in order to provide for connected mode mobility management of the t least one wireless communication device, the base station of the second RAN is operative to transmit, to said at least one wireless communication device, the information indicating the frequencies available in the first RAN for accessing the network served by the mobility management node, receive an indication from said at least one wireless communication device that it is capable of accessing the first RAN using any one of the indicated frequencies, transmit, to the mobility management node for forwarding to the base station of the first RAN, a handover request; and to transmit, to said at least one wireless communication device, an instruction to handover to the base station of the first RAN if the request is allowed.

In a seventh aspect of the invention, a computer program is provided comprising computer-executable instructions for causing a base station to perform steps recited in the method of the first aspect when the computer-executable instructions are executed on a processing unit included in the base station.

In an eight aspect of the invention, a computer program product is provided comprising a computer readable medium, the computer readable medium having the computer program of the seventh aspect embodied thereon.

In a ninth aspect of the invention, a computer program is provided comprising computer-executable instructions for causing a mobility management node to perform steps recited in the method of the third aspect when the computer-executable instructions are executed on a processing unit included in the mobility management node.

In a tenth aspect of the invention, a computer program product is provided comprising a computer readable medium, the computer readable medium having the computer program of the ninth aspect embodied thereon.

In an eleventh aspect of the invention, a computer program is provided comprising computer-executable instructions for causing a base station to perform steps recited in the method of the fifth aspect when the computer-executable instructions are executed on a processing unit included in the base station.

In a twelfth aspect of the invention, a computer program product is provided comprising a computer readable medium, the computer readable medium having the computer program of the eleventh aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
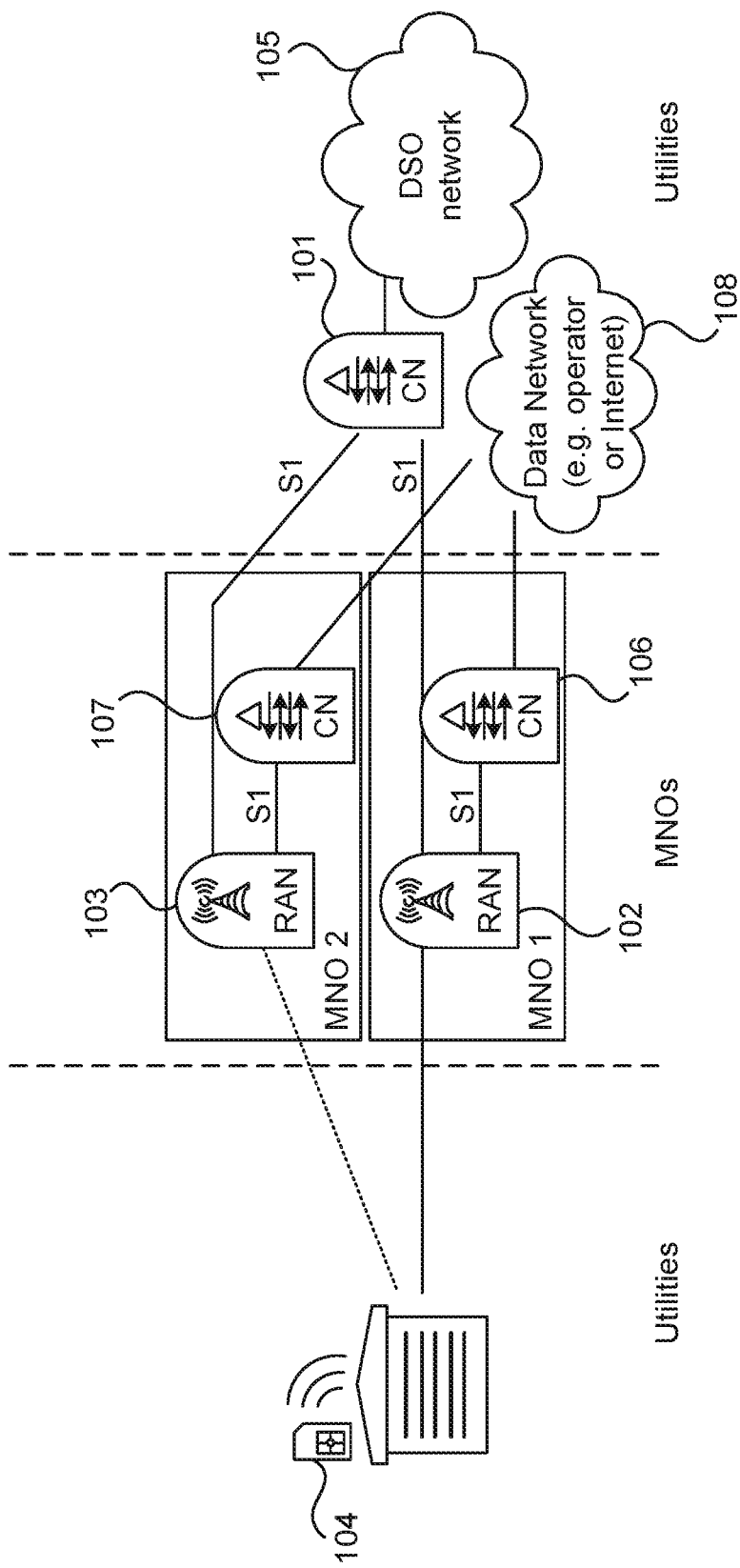
FIG. 1 shows a simplified prior art communication network in which the present invention can be implemented.

FIG. 1 shows a simplified prior art communication network in which the present invention can be implemented.

In this case, a utilities party, being for instance a power distributor, operates a core network 101 and integrates with radio access networks (RANs) of two or more mobile network operators (MNOs) via an S1 reference point, in this example with a first RAN 102 of MNO1 a and a second RAN 103 of MNO2. It should be noted that the utilities context is exemplifying only, and other scenarios are envisaged, such as for instance an Internet of Things (IoT) context.

The core network 101 of the utilities party is configured to connect any utilities communication device 104—referred to in the following as a User Equipment (UE)—embodied in the form of e.g. a modem, a smart phone, a tablet, a smart watch, a television set, etc., of for instance in the form of an IoT device such as a thermometer, a power sensor, an actuator, etc., to a so called Distribution System Operator (DSO) network 105 operated by the utilities party (the utilities party and the DSO are thus the same), while the MNOs also have their own core networks 106, 107 for connecting other UEs to a data network 108 such as the Internet or a data network 108 operated by the respective MNO. Generally, the utilities UE 104 does not have credentials to access the core networks of the MNOs.

FIG. 1 illustrates a scenario where the utilities party is integrating with two different MNOs, while in a generic case, the utilities can integrate with a great number of MNOs. This network structure is typically fully standard-compliant and commonly referred to as Multi-Operator Core Network (MOCN) and as can be concluded from FIG. 1, one of the core network operators is the utilities party itself. The utilities party typically owns and operates core network 101, but buys radio connectivity from one or more MNOs, e.g. MNO1 and MNO2. The expected case is that there will be several MNOs available, since that will increase the reliability and resiliency. However, the number of available MNOs in each individual DSO UE (i.e. utilities UE) location may vary.

In the normal MOCN case, a single RAN is shared while the core networks are separate. This single RAN is typically a conventional, coordinated RAN. In the network structure shown in FIG. 1, the core network 101 of the utilities party is connected to multiple RANs 102, 103 of different MNOs which hence may be referred to as MOCN with multiple RANs.

The different RANs 102, 103 are managed and controlled by different MNOs—i.e. MNO1 and MNO2, respectively—and have no relation to each other in terms of coordination or configuration. Therefore, an even more precise descriptive term for this structure is MOCN with multiple non-coordinated RANs. In other words, the exemplified first RAN 102 and second RAN 103 are both non-coordinated, i.e. the first RAN 102 does not have knowledge about the second RAN 103 and vice versa.

Figure 2:
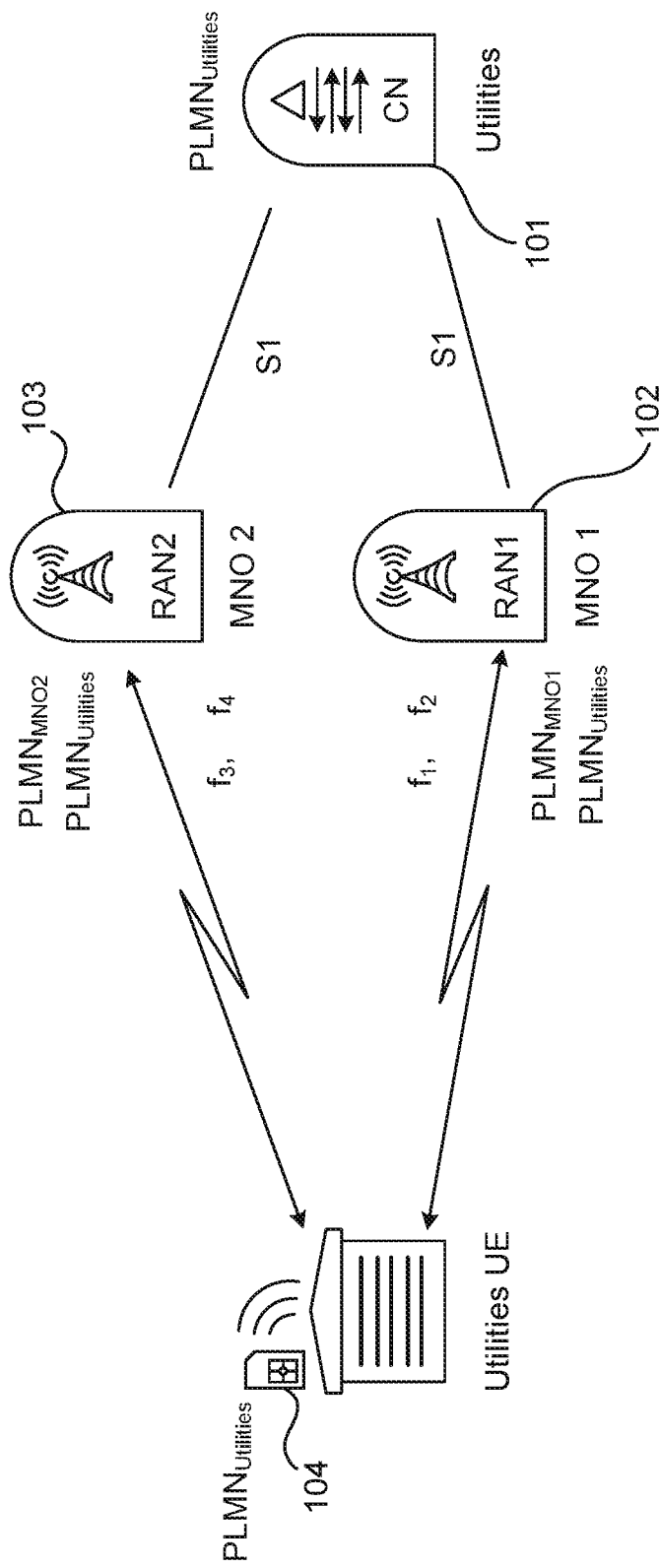
FIG. 2 shows a simplified prior art communication network in which the present invention can be implemented.

FIG. 2 illustrates that the shared RANs 102, 103 typically indicate multiple Public Land Mobile Network (PLMN) identifiers (PLMN-IDs) to the utilities UE 104. For example, the RAN 102 of MNO1 is shared by the utilities party and MNO1, while the RAN 103 of MNO2 is shared by the utilities party and MNO2. The different RANs can provide either fully or partly overlapping coverage. Further, in practice each RAN comprises a plurality of base stations providing coverage in the RAN.

Hence, in an MOCN with multiple non-coordinated RANs, both MNO1 and MNO2 broadcast the PLMN identifier of the utilities party for connecting to the DSO network operated by the utilities party, which is referred to as $PLMN_{Utilities}$ or in short $PLMN_U$, while each MNO also broadcasts its own PLMN identifier, referred to as $PLMN_{MNO1}$ and $PLMN_{MNO2}$, respectively. The RAN cells of each MNO use the radio spectrum and frequencies that belong to them: for example, f1 and f2 for MNO1, and f3 and f4 for MNO2. The DSO PLMN service of the utilities party, i.e. $PLMN_U$ or $PLMN_{Utilities}$, is thus available at all frequencies from f1 to f4.

It is noted the a PLMN-ID is one example of an identifier of a network. Other examples of such identifiers are for example Organizational ID (OID) and Domain Identifiers such as "DSOx.com"; any appropriate information that can be used to identify a network may be envisaged.

A problem with MOCN with multiple non-coordinated RANs as illustrated in FIGS. 1 and 2 is that the DSO PLMN service of the utilities party is available in two different RANs (the first RAN 102 and the second RAN 103) that are unaware of each other, and there is no coordination of the two.

Again with reference to FIG. 2, a utilities UE 104 attempting to perform idle mode mobility, i.e. a cell reselection from a cell in the first RAN 102 operated by MNO1 to a cell in the second RAN 103 hosted by MNO2, will not be provided with cell information, e.g. available cell frequencies, for the cell in the second RAN 103.

In this case, the utilities UE 104 will limit reselection to cells and/or frequencies listed by MNO1 hosting the first RAN 102, and will as a consequence every now and then camp on unnecessarily poor cells. If no suitable cells can be found among the listed frequencies, the utilities UE 104 will enter "any cell search" and perform a cell scanning procedure, which consists of the utilities UE 104 scanning all the frequencies it supports in order to find a cell that the utilities UE 104 is allowed to connect to.

Eventually, it will most likely find the registered $PLMN_U$ on either of frequencies f3 or f4. Since $PLMN_U$ has highest priority, the utilities UE 104 will camp on that cell. This scanning procedure can take significantly long time—sometimes in the order of a minute—and will most certainly result in service interruption.

Connected mode mobility—i.e. handover between the first RAN 102 of MNO1 and the second RAN 103 of MNO2—will not work, since a base station—such as e.g. an Evolved NodeB (eNB)—of the first RAN 102 is not configured with the frequencies available in the second RAN 103 and will thus never order UE measurements in this respect, neither is it configured with information needed for handover routing to a base station in the second RAN, such as e.g. a Tracking Area Identity (TAI) and/or a Global eNB Identifier of the base station in the second RAN. Hence, no handovers will be initiated by the eNB in the first RAN 102 operated by MNO1 to an eNB in the second RAN 103 operated by MNO2.

The invention tackles these problems by providing a solution where the eNBs operated by one operator are made aware of RAN cells provided by eNBs hosted by another operator, which is particularly useful for the previously discussed deployment referred to as "MOCN with multiple non-coordinated RAN". Advantageously, both idle mode mobility (cell reselection) and connected mode mobility (handover) between RANs 102, 103 operated by different operators is facilitated and thus prevents service interruption at the utilities UE 104.

Figure 3:
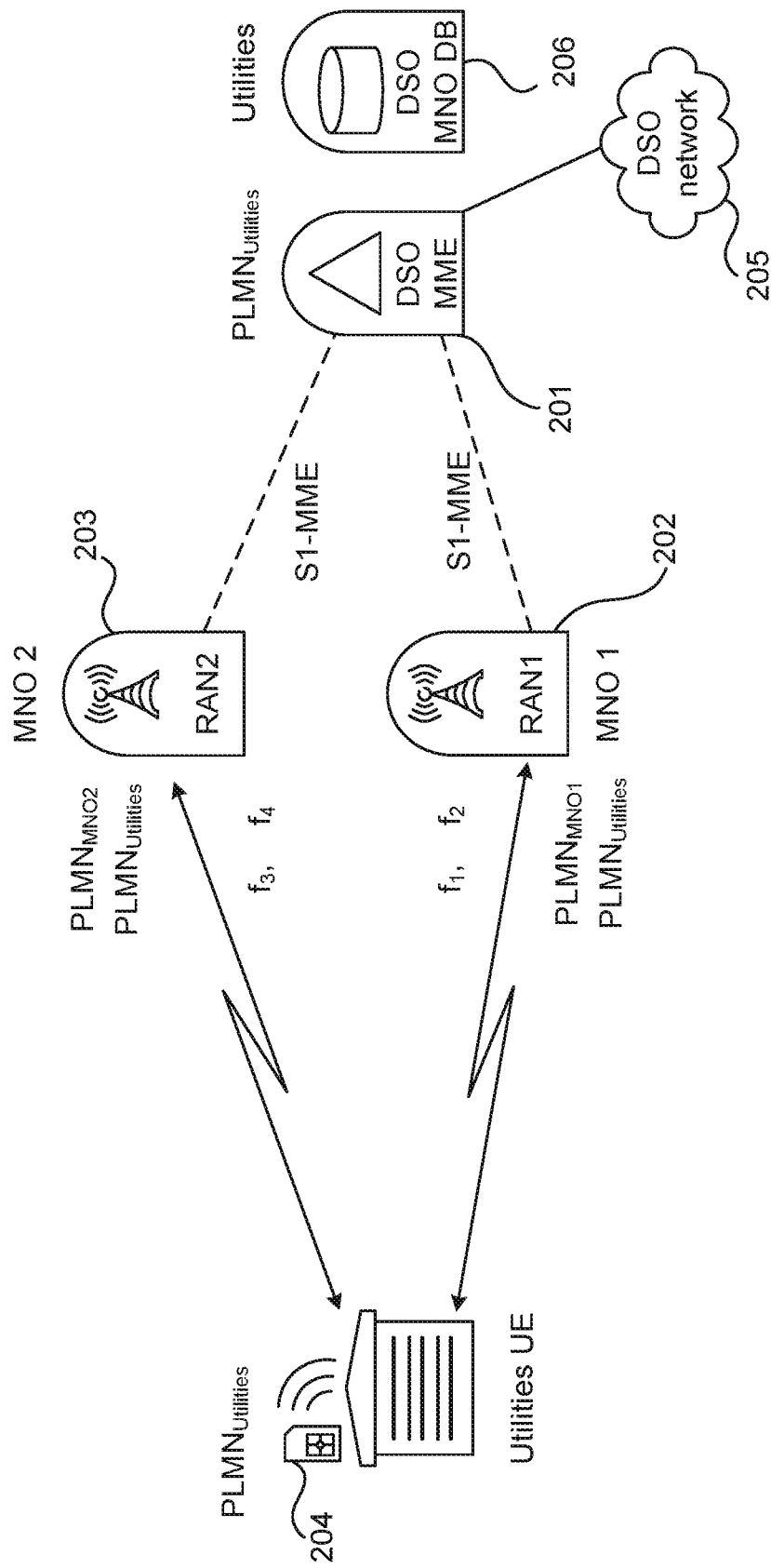
FIG. 3 illustrates a communication network in which a mobility management node is implemented according to an embodiment.

FIG. 3 illustrates a communication network in which a mobility management node is implemented according to an embodiment.

Again, a utilities party (such as a power distributor or DSO) operates a core network and interfaces with radio access networks RANs of one or more mobile network operators MNO1, MNO2 via a mobility management node 201, which in the following is referred as a DSO Mobility Management Entity (MME), for managing connection of the utilities UE 204 to the DSO network 205.

Hence, the DSO MME 201 connects via an S1-MME interface or reference point to a first base station 202, referred to as an evolved NodeB (eNB), operating a first RAN and to a second base station 203 operating a second RAN. Again, each RAN will in practice typically comprise multiple base stations.

As previously discussed, both MNO1 and MNO2 broadcasts an identifier of a network served by the DSO MME 201, which in example is embodied by the PLMN identifier of the utilities party ($PLMN_U$), while each MNO also broadcasts its own PLMN identifier referred to as $PLMN_{MNO1}$ and $PLMN_{MNO2}$, respectively. The RAN cells of each MNO use the radio spectrum and frequencies that belong to them: for example, f1 and f2 are used by the first eNB 202 for MNO1, and f3 and f4 are used by the second eNB 203 for MNO2. The DSO PLMN service providing access to the DSO network 205 of the utilities party is thus available in all frequencies from f1 to f4.

As further shown in FIG. 3, a DSO MNO database (DB) 206 may be connected to the DSO MME 201 for storing appropriate data as regards the RANs of MNO1 and MNO2, such as for instance the frequencies available for accessing the DSO network 205 identified by $PLMN_U$ and/or information about the location of the different eNBs in the different RANs in order to find a suitable eNB to which adequate information can be forwarded. The DSO MNO DB 206 may be located remote from the DSO MME 201. However, it is also envisaged that any data stored at the DSO MNO DB 206 alternatively is stored locally at the DSO MME 201.

The current invention enables both idle and connected mode mobility between multiple non-coordinated RANs, and especially for any utilities UEs which is capable of connecting to a network served by the DSO MME 201, as identified by means of $PLMN_U$.

One way of solving the service interruption during handover (i.e. connected mode mobility) is by means of exchanging information between the different non-coordinated RANs so that the RAN provided by the second eNB 203 operated by MNO2 can enable measurements for the utilities UE 204 on the RAN provided by the first eNB 202 operated by MNO1 in order to facilitate a potential handover of the utilities UE 204 from the second eNB 203 to the first eNB 202.

This is enabled in an embodiment by the first eNB 202 operated by MNO1 informing the second eNB 203 operated by MNO2 about the frequencies available in the first RAN for accessing the core network served by the DSO MME 201 being identified with $PLMN_U$, and any other information required for handover routing via the DSO MME 201.

It should be noted that the first eNB 202 is not necessarily aware of the existence of the second eNB 203; in some cases, the DSO MME 201 may request the information from the first eNB 202, and then identifies the relevant second eNB 203 without any further cooperation with the first eNB 203.

In the generic case, the two RANs belong to different MNOs, and the first eNB 202 and the second eNB 203 thus cannot exchange information between each other. That is, the RANs are non-coordinated. However, in an embodiment, a common point between the two is created with the core network of the DSO/utilities party and more particular with the DSO MME 201 serving the core network of the utilities party.

Figure 4:
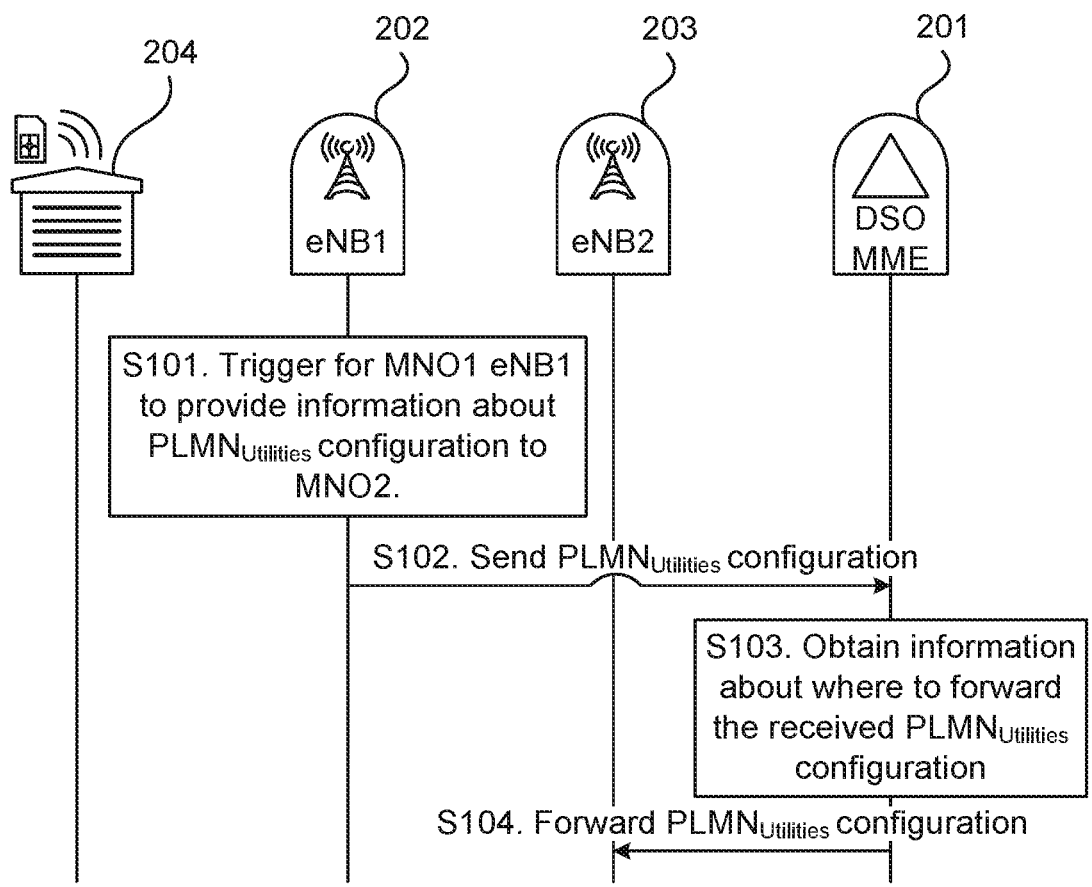
FIG. 4 shows a signalling diagram illustrating an embodiment of a mobility management node managing two non-coordinated RANs hosted by different MNOs.

FIG. 4 shows a signalling diagram illustrating an embodiment of the mobility management node 201—being arranged in a core network hosted by a utilities party—managing two non-coordinated RANs hosted by different MNOs, as well as of the first eNB 202 and the second eNB 203.

It is noted that prerequisites for the embodiment of FIG. 4 are that both the first eNB 202 hosted by MNO1 and the second eNB 203 hosted by MNO2 are providing services associated with the $PLMN_U$ of the DSO/utilities party in the area where the utilities UE 204 currently is located. Hence, it should be possible for the utilities UE 204 to be served by the two eNBs 202, 203. In this exemplifying embodiment, the mobility management node 201 (i.e. the DSO MME) does not turn to DSO MNO DB 206 for acquiring necessary RAN and/or eNB information. Instead, this information is stored locally in the DSO MME 201.

In step S101, the first eNB 202 of the first RAN determines that information indicating frequencies f1, f2 associated with the $PLMN_U$ identifying the core network served by the DSO MME 201 should be transmitted to the DSO MME 201.

Hence, the indicated frequencies f1, f2 are frequencies being available in the first RAN for the utilities UE 204 to access the core network served by the DSO MME 201. It is noted that at this point, the utilities UE 204 is not yet necessarily located in the service areas of first eNB 202 or second eNB 203. The information exchange is typically for enabling of later idle mode and/or connected mode mobility from the second RAN and second eNB 203 to the first RAN and first eNB 202 for the utilities UE 204.

Hence, the first eNB 202 hosted by MNO1 is triggered to provide information regarding eNB1 frequency configuration for the $PLMN_U$ services to the DSO MME 201 for forwarding to the second eNB 203 hosted by MNO2. Again, it is noted that the first eNB 202 may not be aware of the second eNB 203.

In an embodiment, this trigger may be local to the first eNB 202, for instance caused by a configuration change for the first eNB 202 such as adding or terminating radio cells, or by a boot process for the first eNB 202.

In an alternative embodiment, the trigger is external, for instance in the form of a message or request from the DSO MME 201. In such an embodiment, the DSO MME 201 may further transmit information relating to the second eNB 203 operated by MNO2.

In step S102, the first eNB 202 transmits information indicating frequencies f1, f2 available in the first RAN for $PLMN_U$, via which frequencies the utilities UE 204 is allowed to access the core network and thus the DSO network 205 operated by the utilities party, to the DSO MME 201 which serves said core network, for forwarding to the second eNB 203 of the second RAN. In an embodiment, the first eNB 202 also transmits an identifier of the network served by the DSO MME 201, e.g. $PLMN_U$.

In an embodiment, the transmission further comprises handover routing information such as e.g. a Tracking Area Identity (TAI) and/or a Global eNB Identifier of the first eNB 202 for the purpose of enabling connected mobility of the utilities UE 204.

Upon receiving $PLMN_U$ and information indicating frequencies f1, f2 available in the first RAN for $PLMN_U$ in step S102, the DSO MME 201 acquires information indicating the second eNB 203 of the second RAN to which the utilities UE 204 potentially may be connected.

That is, in case utilities UE 204 would be connected to the second eNB 203, the first eNB 202 is a base station to which the utilities UE 204 can be handed over, and this potential handover is enabled by the second eNB 203 becoming aware of the frequency information of the first eNB 202 and the above mentioned handover routing information, while for managing idle mode mobility the frequency information of the first eNB 202 is used (optionally along with the identifier of the network served by the DSO MME 201).

Hence, to conclude, the second eNB 203 requires the frequency information of the first eNB 202 for managing idle mode mobility as well as for managing connected mode mobility.

For instance, the DSO MME 201 may have access to a database containing information about which eNBs from different MNOs are located in the same area as the first eNB 202, and which eNBs further provide service for the core network operated by the DSO MME 201 identified by means of $PLMN_U$. As previously discussed, the database may be held remote from the DSO MME 201, e.g. in DSO MNO DB 206, or may be stored locally.

In this exemplifying embodiment, the DSO MME 201 identifies the second eNB 203, and transmits an identifier of the first eNB 202 (e.g. TAI and/or Global eNB ID) of the first RAN and the frequencies f1, f2 available in the first RAN for $PLMN_U$ to the second eNB 203 in step S104. The information may be transmitted in an Information Element (IE) or an Extended IE.

Advantageously, the embodiment described with reference to FIG. 4 enables coordination of the two RANs, and the utilities UE 204 is allowed to move between frequencies f1, f2 via which the DSO MME 201 is available for access in the first RAN and between additional frequencies f3, f4 via which the DSO MME 201 is available for access in the second RAN. For instance, fast re-connection of the utilities UE 204 is enabled upon a failure in the currently serving MNO RAN, which implies that the utilities UE 204 will perform a cell reselection, since the failure is not foreseen. Hence, the embodiment enables the base stations 202, 203 to manage mobility of the utilities UE 204.

In a further embodiment, upon receiving the information indicating the frequencies f1, f2 available in the first RAN for $PLMN_U$, the second eNB 203 stores the information for later use. It should be noted that a UE requiring the information is not necessarily currently in the area served by the second eNB 203.

In the case of idle mode mobility, when the utilities UE 204 connects to the second eNB 203, the second eNB 203 informs the utilities UE 204 of the frequencies f1, f2. For instance, so called dedicated priorities may be applied meaning that the frequency information is only sent to a UE being capable of accessing the network identified by $PLMN_U$ and for example when moving from connected to idle mode. One example of this is the sending of a RRC-ConnectionRelease message from the second eNB 203 to the utilities UE 204 to move the utilities UE 204 from connected mode to idle mode and inclusion of the dedicated priorities information in the idleModeMobilityControlInfo IE in the RRCConnectionRelease message.

The forwarding of the information to the utilities UE 204 from the second eNB 203 may be performed using a Radio Resource Control (RRC) message.

In another embodiment, in addition to storing the information indicating the frequencies f1, f2 available in the first RAN for PLMN$_U$, the second eNB 203 further stores the above discussed handover routing information.

In the case of connected mode mobility, when the utilities UE 204 is connected to the second eNB 203, the second eNB 203 may check whether the utilities UE 204 is in vicinity of the first eNB 202 or not (for example because the service provided from the second eNB 203 is deteriorating).

The second eNB 203 may thus instruct the utilities UE 204 to check whether the utilities UE 204 is capable of accessing the first eNB 203 via the frequencies f1, f2 or not and report back to the second eNB 203 (and possibly even to report a measured communication quality for the frequencies f1, f2).

If an handover to the first eNB 202 is reported to be possible, the second eNB 203 may decide that the utilities UE should be handed over to the first eNB 202. The second eNB 203 may send a handover request to the first eNB 202 via the DSO MME 201 using the stored handover routing information, and then instruct the utilities UE 204 to perform the handover to the first eNB 202, if the handover is accepted by the first eNB 202.

Figure 5:
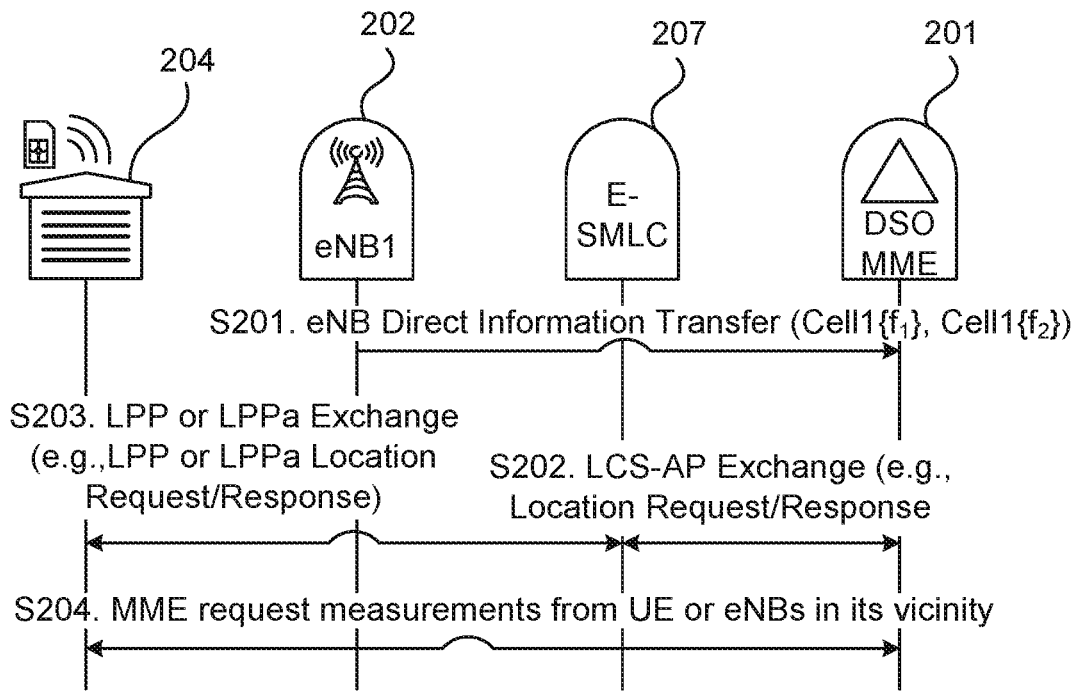
FIG. 5 shows a signalling diagram illustrating further embodiments of the invention.

FIG. 5 illustrates a signalling diagram of embodiment where the DSO MME 201 collects data for building a database comprising location information for base stations connected the DSO MME 201 and/or frequencies provided by the base stations for connecting to the DSO MME 201.

In a first step S201, the first eNB 202 may optionally send information indicating the frequencies f1, f2 via which the DSO MME 201 identified by PLMN$_U$ is available via the first eNB 202 as a trigger for the subsequent steps, even if the DSO MME 201 indeed could decide to perform the subsequent steps without step S201.

The DSO MME 201 uses Location Services Application Protocol (LCS-AP) signalling in step S202 to issue a Location Request procedure towards an Enhanced Serving Mobile Location Center (E-SMLC) for one of the utilities UEs 204 connected to the first eNB 202, which in its turn requests the utilities UE 204 to report its location to the E-SMLC 207 in step S203.

Finally, the DSO MME 201 requests the utilities UE 204 to indicate all eNBs that the utilities UE 204 can receive signals from in step S204, for instance the previously discussed second eNB 203, and the database of the DSO MME 201 (either external or internal) is updated accordingly.

Embodiments have been described hereinabove in the context of a fourth generation (4G) communication system, e.g. a Long Term Evolution (LTE) system with an Evolved Packet Core (EPC) network and corresponding functions. The embodiments can also be applied to other mobile systems, for example to a fifth generation (5G) networks including both LTE and New Radio (NR) radio accesses. In a 5G setting, the DSO MME 201 would be replaced with a DSO Access and Mobility Management Function (AMF). The DSO AMF can generally use any of current or future UE positioning reports to deduce (approximate) UE positions. Examples are given in TS38.305 and related specifications (currently not existing but only planned) for 5G.

Further, in the 5G setting, the RANs may comprise eNBs and/or what is commonly referred as next generation NBs (gNBs). Thus, instead of the S1-MME reference point of FIG. 3, the DSO AMF would be connected to any base station via NG-C/N2 reference point, where NG-C is the term used by 3rd Generation Partnership Project (3GPP) RAN working groups while N2 is the term used by 3GPP Service and System Aspects Working Group 2 (SA2).

Further, embodiments may be implemented in a RAN slicing context.

Figure 6:
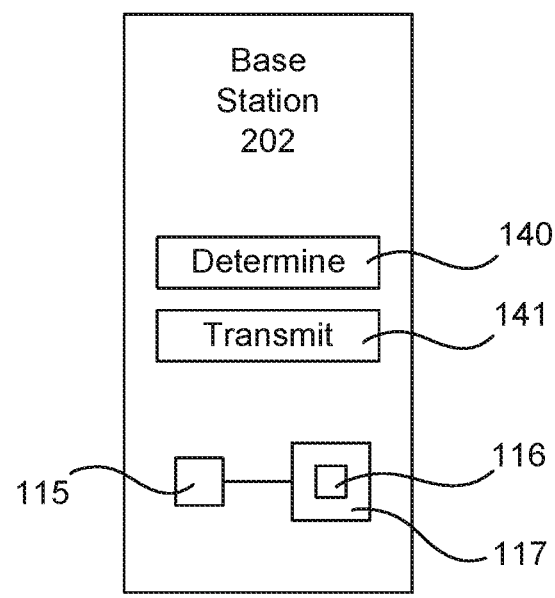
FIG. 6 illustrates a base station according to an embodiment.

FIG. 6 illustrates a base station 202 of a first RAN according to an embodiment. The steps of the method performed by the base station 202 of facilitating management of mobility of a wireless communication device according to embodiments are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the base station 202 to carry out the method according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD), etc.

The base station 202 comprises determining means 140 adapted to determine that information indicating frequencies associated with an identifier of a network which said at least one wireless communication device is allowed to access should be transmitted to a mobility management node serving the identified network, the indicated frequencies being available in the first RAN for accessing the identified network, and transmitting means 141 adapted to transmit the information indicating frequencies available in the first RAN for accessing said identified network to the mobility management node serving the identified network for forwarding to the base station of the second RAN, said identified network being operated by an operator different from those operating the first and second non-coordinated RANs.

The means 140 and 141 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 7:
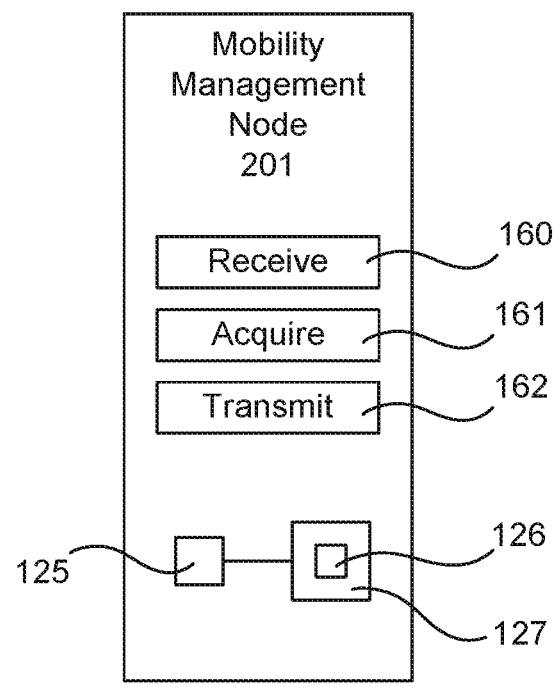
FIG. 7 illustrates a mobility management node according to an embodiment.

FIG. 7 illustrates a mobility management node 201 according to an embodiment. The steps of the method performed by the mobility management node 201 in a core network of managing a plurality of non-coordinated RANs connected to the core network according to embodiments are in practice performed by a processing unit 125 embodied in the form of one or more microprocessors arranged to execute a computer program 126 downloaded to a suitable storage volatile medium 127 associated with the microprocessor, such as a RAM, or a non-volatile storage medium such as a Flash memory or a hard disk drive. The processing unit 125 is arranged to cause the mobility management node 201 to carry out the method according to embodiments when the appropriate computer program 126 comprising computer-executable instructions is downloaded to the storage medium 127 and executed by the processing unit 125. The storage medium 127 may also be a computer program product comprising the computer program 126. Alternatively, the computer program 126 may be transferred to the storage medium 127 by means of a suitable computer program product, such as a DVD or a memory stick. As a further alternative, the computer program 126 may be downloaded to the storage medium 127 over a network. The processing unit 125 may alternatively be embodied in the form of a DSP, an ASIC, a FPGA, a CPLD, etc.

The mobility management node 201 comprises receiving means 160 adapted to receive, from a base station of a first of the plurality of RANs, information indicating frequencies available in the first RAN for accessing a network served by the mobility management node 201, acquiring means 161 adapted to acquire information identifying a base station of a second of the plurality of RANs, said network being operated by an operator different from those operating the first and second RANs, and transmitting means 162 adapted to transmit, to the base station of the second RAN, the information indicating the frequencies available in the first RAN for accessing said identified network.

The means 160-162 may comprise communications interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

Figure 8:
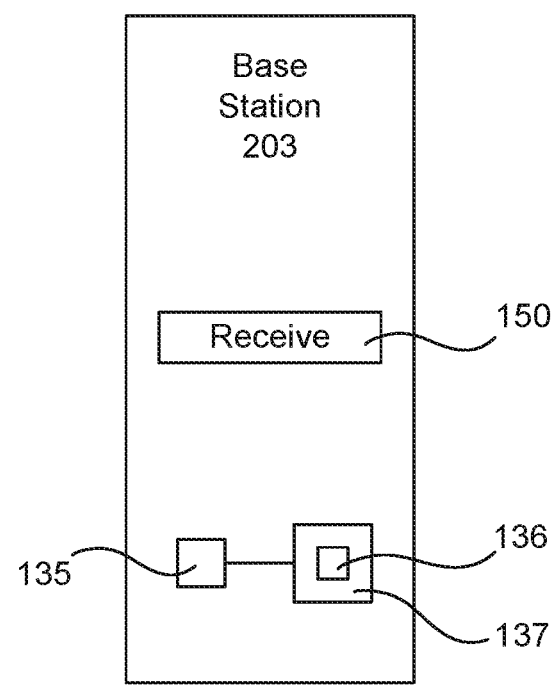
FIG. 8 illustrates a base station according to another embodiment.

FIG. 8 illustrates a base station 203 of a second RAN according to an embodiment. The steps of the method performed by the base station 203 of facilitating management of mobility of a wireless communication device according to embodiments are in practice performed by a processing unit 135 embodied in the form of one or more microprocessors arranged to execute a computer program 136 downloaded to a suitable storage volatile medium 137 associated with the microprocessor, such as a RAM, or a non-volatile storage medium such as a Flash memory or a hard disk drive. The processing unit 135 is arranged to cause the base station 203 to carry out the method according to embodiments when the appropriate computer program 136 comprising computer-executable instructions is downloaded to the storage medium 137 and executed by the processing unit 135. The storage medium 137 may also be a computer program product comprising the computer program 136. Alternatively, the computer program 116 may be transferred to the storage medium 137 by means of a suitable computer program product, such as a Digital Versatile Disc (DVD) or a memory stick. As a further alternative, the computer program 136 may be downloaded to the storage medium 137 over a network. The processing unit 135 may alternatively be embodied in the form of a digital signal processor (DSP), an application specific integrated circuit (ASIC), a field-programmable gate array (FPGA), a complex programmable logic device (CPLD), etc.

The base station 203 comprises receiving means 150 adapted to receive, from a mobility management node, information indicating frequencies available in the first RAN for accessing a network served by the mobility management node, said network being operated by an operator different from those operating the first and second RANs.

The means 150 may comprise communication interface(s) for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive. The base station 203 may further comprise an idle mode connectivity handler and a connected mode connectivity handler.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a base station of a first of a plurality of non-coordinated radio access networks, RANs, in a wireless communication network of facilitating, for a base station of a second of the plurality of non-coordinated RANs, connection of at least one wireless communication device which can be served by the base station of the first RAN, the method comprising:

determining that information indicating frequencies associated with an identifier of a network which said at least one wireless communication device is allowed to access should be transmitted to a mobility management node serving the identified network, the indicated frequencies being available in the first RAN for accessing the identified network; and transmitting the information indicating frequencies available in the first RAN for accessing said identified network to the mobility management node serving the identified network for forwarding to the base station of the second RAN, said network being operated by an operator different from those operating the first and second non-coordinated RANs.

2. The method of claim 1, wherein the determining that the information indicating the available frequencies should be transmitted to the mobility management node is triggered by one or more events including a configuration change for the base station of the first RAN, a boot process of the base station of the first RAN, and a message received from the mobility management node.

3. The method of claim 1, wherein the transmitting comprises a Tracking Area Identity, TAI, and/or a Global eNB Identifier of the base station of the first RAN is transmitted to the mobility management node with the information indicating the available frequencies.

4. The method of claim 1, wherein the transmitting of the information indicating frequencies available in the first RAN for accessing said identified network further comprising transmitting the network identifier.

5. A method of a mobility management node of managing a plurality of non-coordinated radio access networks, RANs, in a wireless communication network, the method comprising:

receiving, from a base station of a first of the plurality of RANs, information indicating frequencies available in the first RAN for accessing a network served by the mobility management node;

acquiring information identifying a base station of a second of the plurality of RANs, said network being operated by an operator different from those operating the first and second RANs; and transmitting, to the base station of the second RAN, the information indicating the frequencies available in the first RAN for accessing said network.

6. The method of claim 5, wherein the transmitting of the information indicating the frequencies available in the first RAN for accessing said identified network further comprises transmitting a Tracking Area Identity, TAI, and/or a Global eNB Identifier of the base station of the first RAN.

7. The method of claim 5, wherein the receiving of the information indicating frequencies available in the first RAN for accessing said identified network further comprising receiving an identifier of the network served by the mobility management node.

8. The method of claim 5, wherein the transmitting, to the base station of the second RAN, of the information indicating the frequencies available in the first RAN for accessing said network further comprising transmitting the identifier of the network served by the mobility management node.

9. The method of claim 5, wherein the acquiring of the information identifying the base station of the second RAN comprises:
  sending a request for the information to an external information providing device, the device storing information identifying one or more base stations to which said at least one wireless communication device is capable of connecting; and
  receiving, in response to the request, the information identifying said base station of the second RAN.

10. The method of claim 5, wherein the base station of a second of the plurality of RANs is selected based on a location of the base station of the first RAN.

11. A method of a base station of a second of a plurality of non-coordinated radio access networks, RANs, in a wireless communication network of facilitating connection of at least one wireless communication device to a first of the plurality of non-coordinated RANs, the method comprising:
  receiving, from a mobility management node, information indicating frequencies available in the first RAN for accessing a network served by the mobility management node, said network being operated by an operator different from those operating the first and second RANs.

12. The method of claim 11, wherein the receiving of the information indicating the frequencies available in the first RAN for accessing said identified network further comprises receiving a Tracking Area Identity, TAI, and/or a Global eNB Identifier of the base station of the first RAN.

13. The method of claim 11, wherein the base station storing the received information indicating frequencies available in the first RAN for accessing a network served by the mobility management node for subsequently managing idle or connected mode mobility of said at least one wireless communication device being capable of accessing said network.

14. The method of claim 13, wherein the base station further storing the Tracking Area Identity, TAI, and/or a Global eNB Identifier of the base station of the first RAN.

15. The method of claim 11, further comprising:
  transmitting, to said at least one wireless communication device, the information indicating the frequencies available in the first RAN for accessing the network served by the mobility management node.

16. The method of claim 11, further comprising:
  transmitting to said at least one wireless communication device, the information indicating the frequencies available in the first RAN for accessing the network served by the mobility management node;
  receiving an indication from said at least one wireless communication device that it is capable of accessing the first RAN using any one of the indicated frequencies;
  transmitting, to the mobility management node for forwarding to the base station of the first RAN, a handover request; and
  transmitting, to said at least one wireless communication device, an instruction to handover to the base station of the first RAN if the request is allowed.

17. The method of claim 11, wherein the mobility management node is a Mobility Management Entity, MME, or an Access and Mobility Management Function, AMF.

18. The method of claim 11, wherein the identifier of the network served by mobility management node comprises a Public Land Mobile Network, PLMN, identifier.

19. A base station of a first of a plurality of non-coordinated radio access networks, RANs, in a wireless communication network configured to facilitate, for a base station of a second of the plurality of non-coordinated RANs, connection of at least one wireless communication device which can be served by the base station of the first RAN, said base station comprising a processor and a memory, said memory containing instructions executable by said processor, whereby the base station is operative to perform operations comprising:
  determine that information indicating frequencies associated with an identifier of a network which said at least one wireless communication device is allowed to access should be transmitted to a mobility management node serving the identified network, the indicated frequencies being available in the first RAN for accessing the identified network, and
  transmit the information indicating frequencies available in the first RAN for accessing said identified network to the mobility management node serving the identified network for forwarding to the base station of the second RAN, said identified network being operated by an operator different from those operating the first and second non-coordinated RANs.

20. The base station of claim 19, wherein the determining that the information indicating the available frequencies should be transmitted to the mobility management node is triggered by one or more of events including a configuration change for the base station of the first RAN, a boot process of the base station of the first RAN, and a message received from the mobility management node.

* * * * *